United States Patent [19]

Levens

[11] 4,442,991
[45] Apr. 17, 1984

[54] CRADLE FOR STOWING CYLINDRICAL TANK

[76] Inventor: Dennis L. Levens, Rte. 2, Hudson, Wis. 54016

[21] Appl. No.: 346,398

[22] Filed: Feb. 8, 1982

[51] Int. Cl.³ .............................................. A47G 23/02
[52] U.S. Cl. .................................... 248/146; 108/55.3
[58] Field of Search ............ 248/154, 146, 102, 311.2, 248/313, 49, 671, 637, 554; 108/55.3; 211/71, 211/13; 220/69

[56] References Cited

U.S. PATENT DOCUMENTS

| 487,765 | 12/1892 | Ormerod | 248/146 X |
|---|---|---|---|
| 691,920 | 1/1902 | Stutz | 220/69 |
| 2,463,880 | 3/1949 | Jones | 248/146 |
| 2,466,323 | 4/1949 | Meyer | 248/146 X |
| 2,743,893 | 5/1956 | Johnston, Jr. | 248/146 |
| 2,778,590 | 1/1957 | Jeannero | 108/55.3 |
| 2,833,501 | 5/1958 | Evans | 108/55.3 |
| 3,071,269 | 1/1963 | Moulds, Jr. | 108/55.3 X |
| 3,387,811 | 6/1968 | Adams, Jr. | 248/146 |
| 3,753,407 | 8/1973 | Tiseth | 108/55.3 X |

Primary Examiner—Ramon S. Britts
Assistant Examiner—Sarah A. Lechok
Attorney, Agent, or Firm—Robert E. Granrud

[57] ABSTRACT

A cylindrical tank such as a scuba tank is stowed in a cradle having a pair of upstanding yokes connected by a central I-beam. The weight of a tank placed in the cradle pinches the tank between the yokes.

7 Claims, 2 Drawing Figures

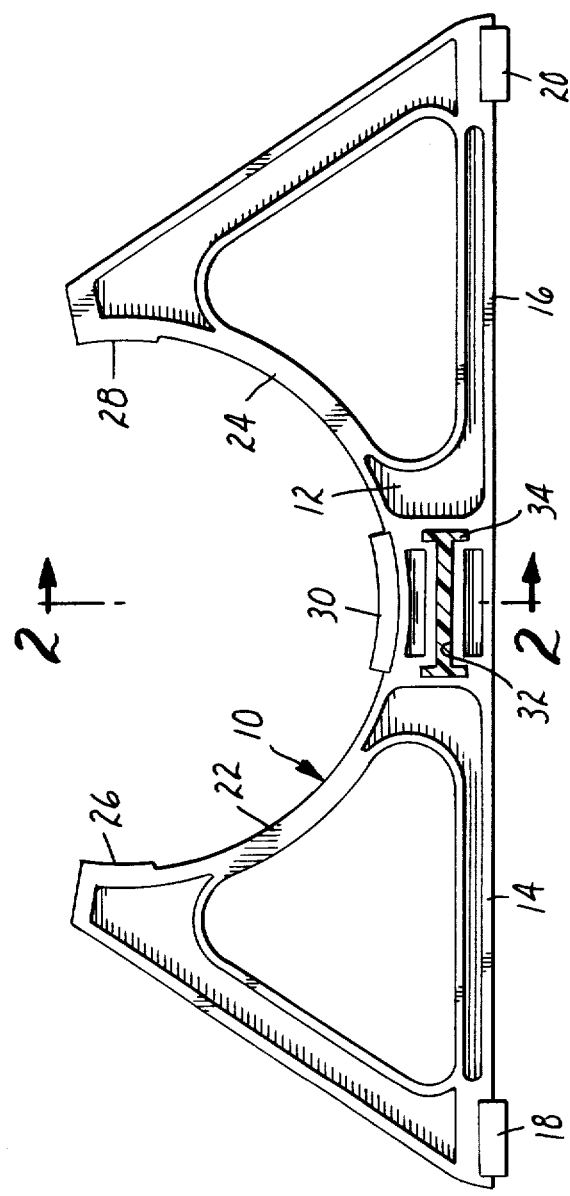

CRADLE FOR STOWING CYLINDRICAL TANK

BACKGROUND TO THE INVENTION

Scuba divers have long been vexed by the problem of securing their scuba tanks while transporting them in automobiles and boats. Unless firmly secured, these heavy tanks may be thrown about by sudden stops or turns to cause damage both to the vehicle and to valves and other equipment mounted on the tanks, while also being hazardous to occupants of the vehicle. Some people construct elaborate bins and racks for the tanks which may involve the use of ropes or straps. Others simply try to wedge the tanks between other gear such as the bags in which they store their diving suits.

THE PRESENT INVENTION

The present invention provides what the inventor believes to be the first economical and convenient device for stowing a cylindrical tank safely on open floor space of a vehicle. The novel device is a cradle for a cylindrical tank comprising a pair of yokes, each having
a nonarticulated framework of two coplanar triangles joined at apexes, one pair of legs forming a generally straight line at the base of the yoke and another pair curving inwardly to a generally semi-cylindrical fork,
a foot near each end of the base,
facing protuberances at the end of the fork that are spaced apart approximately the diameter of the tank,
a cushion projecting inwardly from the center of the fork,
at least one beam rigidly connecting the bases of the yokes to be upstanding when the feet rest on a flat surface, which feet hold said framework and beam above that surface so that the forks provide a cradle for a tank which rests on the cushions, and the tank tends to bow the base and to pinch the tank between the protuberances.

While the cradle may be constructed of any strong, lightweight elastic material such as wood or aluminum, it is preferably plastic and may have only three pieces, namely, two yokes and one connecting beam. One yoke and the beam can be produced by injection molding in a two-cavity mold, preferably equipped with a valve for isolating the beam cavity half of the time. When using ABS plastic, which is preferred because it provides high strength and toughness at reasonable cost, the cushions should be a high-friction rubber to reduce the danger of the tank sliding out of the cradle. Because the protuberances preferably are partial cylinders, each having a radius approximating that of the tank, both protuberances may remain in full contact with the tank as it is lifted off the cushions, but the coefficient of friction between ABS plastic and the painted surface of a scuba tank is sufficiently low so that the tank can be lifted past the protuberances without difficulty.

If the cradle were molded of a plastic which provides somewhat higher coefficient of friction with painted metal, the cushions could be molded integrally with the yoke for economy. However, it would then be desirable either to apply low-friction facings to the protuberances or to increase the unloaded spacing between them.

THE DRAWING

In the drawing:
FIG. 1 is a central section through a cradle of the invention showing one yoke in elevation; and
FIG. 2 is a section along line 2—2 of FIG. 1.

A nonarticulated plastic yoke 10 has a framework of two coplanar triangles joined at apexes to form a bridge 12 connecting legs 14 and 16 of each triangle to form a generally straight line at the base of the yoke. Integrally molded with the base of the yoke are a pair of feet 18 and 20 near the ends of the legs 14 and 16, respectively. As seen in FIG. 2, the feet 18,20 project beyond the width of the remainder of the yoke 10 in order to increase the friction against the flat floor of a vehicle.

The two facing legs 22 and 24 of the triangles form a generally semi-cylindrical fork, the radius of which slightly exceeds that of a cylindrical tank to be stowed. At each end of the semi-cylindrical fork is a protuberance, 26 and 28, the facing surfaces of which are partial cylinders, each of the same radius as that of the tank. A typical aluminum scuba tank is 7.25 inches (18.4 cm) in diameter so that the centers of the protuberances 26,28 are preferably spaced apart 7.25 inches (18.4 cm). To stow a typical steel scuba tank which is only 6.9 inches (17.5 cm) in diameter, one could fasten a shim over each projection of the cradle to reduce the distance between the projections.

Adhered to the bridge 12 is a high-friction rubber cushion 30 (e.g., gasket-grade polychloroprene) which projects inwardly from its bridge 12 as a support for a tank. Portions of the legs 22,24 of the fork between the cushion 30 and the protuberances 26,28 are recessed so as not to be contacted by the tank.

The bridge 12 of the yoke has an I-shaped opening 32 at one face into which one end of an I-beam 34 is fitted and may be adhesively secured. The other end of the I-beam 34 fits into an identical yoke (not shown) to complete the cradle.

When a scuba tank is laid into the cradle while the feet 18,20 rest on a flat surface, the feet hold said framework and I-beam above that surface. The weight of the tank tends to bow the base of each yoke at the bridge 12 outwardly and to pinch the tank between the protuberances 26,28. As soon as the weight of the tank is taken off the cushions, the protuberances return to their normal spacing to permit the tank to be lifted off without difficulty.

The six points of contact with an ABS-plastic cradle including two high-friction rubber cushions 30 have proven to be sufficient to hold the tank in place on a flat floor of a vehicle in tests involving rough roads, sharp turns and quick stops. At the same time there has been very little tendency for the loaded cradle to slide along the floor. However, if the floor is very smooth, it may be desirable to mount high-friction rubber cushions on the feet 18,20.

Preferred ranges of certain dimensions of the cradle shown in the drawing are as follows for a scuba tank which is about 6.9 to 7.25 inches (17.5 to 18.4 cm) in diameter:

| | |
|---|---|
| Length of base of yoke 10 | 30–45 cm |
| Width of yoke 10 | 1.5–2.5 cm |
| Width and length of each foot 18,20 | 2–5 cm |
| Circumferential length of each protuberance 26,28 | 1.5–3.5 cm |
| Circumferential length of cushion 30 | 1.5–8 cm |

| -continued | |
|---|---|
| Thickness of cushion 30 | 0.1–1.0 cm |
| Length of I-beam 34 | 30–50 cm. |

These ranges would be adjusted proportionately for use with cylindrical tanks of larger or smaller diameter.

I claim:

1. A cradle for stowing a cylindrical tank, which cradle comprises
   a pair of yokes, of elastic material each having
      a nonarticulated framework of two coplanar triangles joined at apexes, one pair of legs forming a generally straight line at the base of the yoke and another pair curving inwardly to form a generally semi-cylindrical fork,
      a foot near each end of the base,
      facing protuberances at the ends of the fork that are spaced apart approximately the diameter of the tank,
      a cushion projecting inwardly from the center of the fork,
   a beam rigidly connecting the bases of the yokes to be upstanding when the feet rest on a flat surface, which feet project below the yokes and the beam in the direction of the flat surface to hold said framework and beam above that surface so that the forks provide a cradle for the tank which rests on the cushions, and the tank tends to bow the base and to pinch the tank between the protuberances.

2. A cradle as defined in claim 1 wherein the inner facing surfaces of the protuberances are partial cylinders, each having a radius approximating that of said tank.

3. A cradle as defined in claim 2 wherein the circumferential length of each protuberance is from 10 to 20% of the diameter of said tank.

4. A cradle as defined in claim 1 wherein the yokes are plastic except for the cushions which are high-friction rubber.

5. A cradle as defined in claim 4 wherein the plastic portion of each yoke is a single piece.

6. A cradle as defined in claim 4 wherein the beam is plastic and each yoke has an opening at the center of the base into which one end of the beam is fitted and adhesively secured.

7. A cradle as defined in claim 6 wherein said beam and opening have I-shaped cross-sections.

* * * * *